(12) United States Patent
Hunt et al.

(10) Patent No.: US 12,104,729 B2
(45) Date of Patent: Oct. 1, 2024

(54) QUICK CONNECTOR VERIFICATION SYSTEM AND RELATED METHOD OF USE

(71) Applicant: A. Raymond et Cie, Grenoble (FR)

(72) Inventors: Mitchell W. Hunt, Durand, MI (US); Matthew D. Lutzke, Clarkston, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 18/118,288

(22) Filed: Mar. 7, 2023

(65) Prior Publication Data

US 2024/0068610 A1    Feb. 29, 2024

Related U.S. Application Data

(60) Provisional application No. 63/402,146, filed on Aug. 30, 2022.

(51) Int. Cl.
   *F16L 37/084* (2006.01)
   *F16L 37/14* (2006.01)

(52) U.S. Cl.
   CPC ......... *F16L 37/0841* (2013.01); *F16L 37/142* (2013.01); *F16L 2201/10* (2013.01); *Y10T 29/49826* (2015.01)

(58) Field of Classification Search
   CPC ................ F16L 37/0841; F16L 37/142; F16L 2201/10; F16L 37/1225; F16L 37/0885; F16L 37/084; F16L 37/144
   See application file for complete search history.

(56) References Cited

U.S. PATENT DOCUMENTS

| 6,702,335 B2 | 3/2004 | Bahner et al. |
| 6,846,021 B2 | 1/2005 | Rohde et al. |
| (Continued) | | |

FOREIGN PATENT DOCUMENTS

| CN | 104295837 A | 1/2015 |
| CN | 215371473 U | 12/2021 |
| (Continued) | | |

OTHER PUBLICATIONS http://connecting.araymond-automotive.com/de/glossar/selfy-qc/, downloaded Aug. 17, 2022.

(Continued)

*Primary Examiner* — William S. Choi
(74) *Attorney, Agent, or Firm* — Warner Norcross + Judd LLP

(57) ABSTRACT

A quick connector comprising a connector body having a collar defining an opening, a verification indicia fixed to the collar, and a sliding locker including a base, and a lock arm. The base can include an armature integrally and immovably joined with it, having a wing extending along and spaced from an outer surface of the collar. The lock arm and wing are all simultaneously moveable in unison when the locker transitions from an unlocked mode, where the base protrudes from the transverse opening and supports the wing to obstruct the verification indicia, thereby inhibiting reading and/or scanning of the verification indicia, to a locked mode, where the base is inserted farther into the opening and supports the wing to allow reading and/or scanning of the first verification indicia to confirm proper installation of the quick connector. A related method of use is provided.

16 Claims, 9 Drawing Sheets

(56) References Cited

U.S. PATENT DOCUMENTS

| | | |
|---|---|---|
| 6,866,303 B2 | 3/2005 | Szabo et al. |
| 7,014,220 B2 | 3/2006 | Szabo et al. |
| 7,390,025 B2 | 6/2008 | Pepe et al. |
| 7,464,970 B2 | 12/2008 | Yamada et al. |
| 7,484,774 B2 | 2/2009 | Kerin et al. |
| 7,497,480 B2 | 3/2009 | Kerin et al. |
| 7,527,303 B2 | 5/2009 | Furuya |
| 7,566,077 B2 | 7/2009 | Tsurumi |
| 7,677,608 B2 | 3/2010 | Takayanagi |
| 7,845,684 B2 | 12/2010 | Gaudin |
| 8,033,575 B2 | 10/2011 | Tsurumi |
| 8,240,716 B2 | 8/2012 | Kerin et al. |
| 8,292,333 B2 | 10/2012 | Ogawa et al. |
| 8,297,659 B2 | 10/2012 | Callahan et al. |
| 8,408,604 B2 | 4/2013 | Yamada et al. |
| 8,596,690 B2 | 12/2013 | Yamada et al. |
| 8,613,473 B2 | 12/2013 | Spielmann |
| 9,016,729 B2 | 4/2015 | Ishida et al. |
| 9,212,773 B2 | 12/2015 | Okazaki |
| 9,447,905 B2 | 9/2016 | Nagaya |
| 9,464,852 B2 | 10/2016 | Mann et al. |
| 9,677,699 B2 | 6/2017 | Barthel et al. |
| 9,816,657 B2 | 11/2017 | Daimon et al. |
| 9,816,658 B2 * | 11/2017 | Ishizaka .............. F16L 37/0885 |
| 10,422,459 B2 | 9/2019 | Jones et al. |
| 10,612,708 B2 | 4/2020 | B.V. |
| 11,365,840 B2 | 6/2022 | Gauthier |
| 2003/0052484 A1 | 3/2003 | Rautureau |
| 2012/0242080 A1 | 9/2012 | Nezu |
| 2019/0390807 A1 * | 12/2019 | Yanagisawa ........ F16L 37/0841 |
| 2020/0355308 A1 | 11/2020 | Hunt et al. |
| 2022/0003347 A1 | 1/2022 | Barthel et al. |
| 2022/0010907 A1 * | 1/2022 | Rydin ................. F16L 37/1225 |
| 2022/0243850 A1 | 8/2022 | Teasley et al. |
| 2022/0299143 A1 | 9/2022 | Gabbey et al. |
| 2023/0055432 A1 | 2/2023 | Frederiksen et al. |

FOREIGN PATENT DOCUMENTS

| | | |
|---|---|---|
| DE | 102018219440 A1 | 5/2020 |
| EP | 3943795 A1 | 1/2022 |
| JP | 2010261588 A | 11/2010 |
| JP | 4759421 B2 | 8/2011 |
| KR | 101829496 B1 | 2/2018 |
| KR | 101966161 B1 | 4/2019 |
| WO | 2022128266 A1 | 6/2022 |
| WO | 2022197791 A1 | 9/2022 |

OTHER PUBLICATIONS https://www.araymond-industrial.com/en/technologies/quick-connectors-fluid-lines, downloaded Aug. 17, 2022.

* cited by examiner

QUICK CONNECTOR VERIFICATION SYSTEM AND RELATED METHOD OF USE

BACKGROUND OF THE INVENTION

The present invention relates to couplings, and more particularly to a quick connector having a verification system that provides information regarding the status of a connection.

Quick connectors frequently are used to provide a connection between two or more hoses, conduits or other components, thereby establishing a continuous fluid line between them. Such fluid lines can form part of a larger system of coolant lines, fuel lines, brake lines, liquid transfer lines and the like. Quick connectors can establish a sealed and secured fluid line quickly and efficiently with minimal labor input or complexity.

A number of quick connectors are commercially available. One popular and reliable quick connector, useful in a variety of applications, is the Selfy® QC, available from A. Raymond of Grenoble, France. This connector implements only one assembly operation to connect and secure a fluid line, requiring only one operator due to its automatic connection. This connector further includes a lock that automatically locks when the connector is properly seated relative to the fluid line. This connector is easy to assemble and disassemble single handedly by a user in tight spaces. The lock also provides visual, tactile and audible confirmations to ensure a reliable connection between the quick connector and an associated fluid line. Once securely connected, the locked position of the lock is visibly and notably recessed relative to a housing thereof, to provide a visual que, confirming an obvious confirmation of the connected state of the connector. This can provide assurance to an installer or other user that the connector is acceptably positioned, installed and ready for use.

While the visual confirmation provided by the Selfy® QC and similar connectors is conspicuous and helpful in most applications, some manufacturers require that quick connectors used in their products provide a secondary confirmation of a reliable connection. An example of a conventional secondary confirmation can be in the form of a printed indicia that is viewable through a window of a quick connector. A first component of a quick connector can include verification indicia, and a second component thereof can define a window through which the verification indicia can be read, either manually or via machine. Obstruction-free viewing of the verification indicia requires proper alignment of the first component relative to the second component upon engagement with the fluid line, such that the verification indicia perfectly aligns with the window.

Issues can arise, however, in some applications when the verification indicia become skewed relative to the window, or the window skews relative to the verification indicia, making the verification indicia difficult or impossible to read. Further, the window sometimes may not be moved to fully expose the verification indicia. As a result, that secondary verification may not be readable, in which case, the connection cannot be confirmed and the assembled system may be erroneously rejected, or may require additional processing until it can be confirmed. This can needlessly consume labor time and resources.

Accordingly, there remains a continued need for an improved quick connector that overcomes these and other shortcomings, and in particular, a quick connector with a simple and efficient connection verification system for use in automotive and other applications.

SUMMARY OF THE INVENTION

A quick connector comprising a connector body having a collar defining an opening, a verification indicia fixed to the collar, and a moveable locker including a base, a lock arm and a wing that moves to conceal or expose the verification indicia for reading or scanning.

In one embodiment, the base can include an armature integrally and immovably joined with the base. The armature can include the wing extending along and spaced from an outer surface of the collar. The lock arm and wing can be simultaneously moveable in unison with one another when the locker transitions from an unlocked mode or unconnected state to a locked mode or connected state.

In another embodiment, in the unlocked mode, the base can protrude from a transverse opening defined by the quick connector, and can support the wing to obstruct the verification indicia, thereby inhibiting reading and/or scanning of the verification indicia. In the locked mode, the base can be inserted farther into the opening and can move and support the wing to allow reading and/or scanning of the first verification indicia to confirm proper installation of the quick connector.

In still another embodiment, the wing can cover and hide a portion of the verification indicia, for example, a data matrix code that is printed, applied and/or laser marked on the connecter body. When the quick connecter is adequately secured to a corresponding fluid line, the locker can automatically close and reveal the verification indicia adequately so that it can be read and/or scanned. In turn, this can provide a high level of verification, confirming that the connector has performed in a satisfactory manner and the connection has been made.

In yet another embodiment, the wing can include a wing free end and the lock arm can include an arm free end. The arm free end can be disposed a first distance below the wing free end. This distance can remain constant and/or the same when the locker is in both the unlocked mode and in the locked mode. This can occur because the wing may not move relative to the base of the locker, or the locker in general, and remains in a fixed, spatial orientation relative to the base.

In even another embodiment, the verification indicia can be machine readable and can include a Quick Response (QR) code and/or a bar code. The verification indicia can include a first area. The wing can obstruct at least 10% of the first area when the wing is in a first position, for example, when the locker is in the locked mode. In turn, this can prevent a reading of the verification indicia by a scanner, image device or other machine. As a result, the prevented reading can signify that the connector has not made an adequate connection, and the unit should be inspected, reinstalled, modified and/or replaced to ensure an adequate and/or complete installation of the connector.

In a further embodiment, the collar can include a guide projecting into the transverse opening. The base can include a guide slot. The guide can project into the guide slot. The wing can be joined with the base forward of the guide slot. The lock arm can be joined with the base rearward of the guide slot. The guide slot can be located between the lock arm and the wing in one or both the unlocked and locked modes.

In still a further embodiment, the armature can include a second wing opposing the first wing. The armature can include an armature upper surface. The sliding locker can include a locker upper surface. The armature upper surface can remain a constant distance from the locker upper surface in both the unlocked and locked modes.

In yet a further embodiment, a method is provided. The method can include installing a sliding locker relative to a connector body of a quick connector, the sliding locker including a base, a lock arm and an armature fixedly joined with the base, the armature including a wing extending along the collar and spaced from the outer surface of the collar, the sliding locker being initially configured in an unlocked mode in which a base of the locker at least partially protrudes from the transverse opening, and supports the wing in a first position in which the wing obstructs a verification indicia thereby inhibiting at least one of reading and scanning of the verification indicia. The sliding locker can be configured to transition from the unlocked mode to a locked mode in which the base of the locker is inserted farther into the transverse opening than in the unlocked mode and supports the wing in a second position in which the wing allows at least one of reading and scanning of the first verification indicia, wherein the lock arm and wing all simultaneously move in unison with one another when the sliding locker is transitioned from the unlocked mode to the locked mode.

In even a further embodiment, the method can include transitioning the sliding locker from the unlocked mode to the locked mode and axially bending the first lock arm and the second lock arm during the transitioning so that the lock arm moves away from a free end of the wing.

The current embodiments provide a quick connector that can efficiently and conspicuously provide high level verification concerning proper installation of that connector. Where the sliding locker and wing are integral with one another via the armature, the wing consistently moves in unison with the locker from the unlocked mode to the locked mode. Thus, the verification indicia can be consistently exposed based on the condition of the wing and its spatial relationship relative to the verification indicia. This in turn provides a true and accurate status of the connector by way of reading the verification indicia when covered or uncovered by the wing, which again can have a spatial orientation tied to the placement of the locker relative to the connector body.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
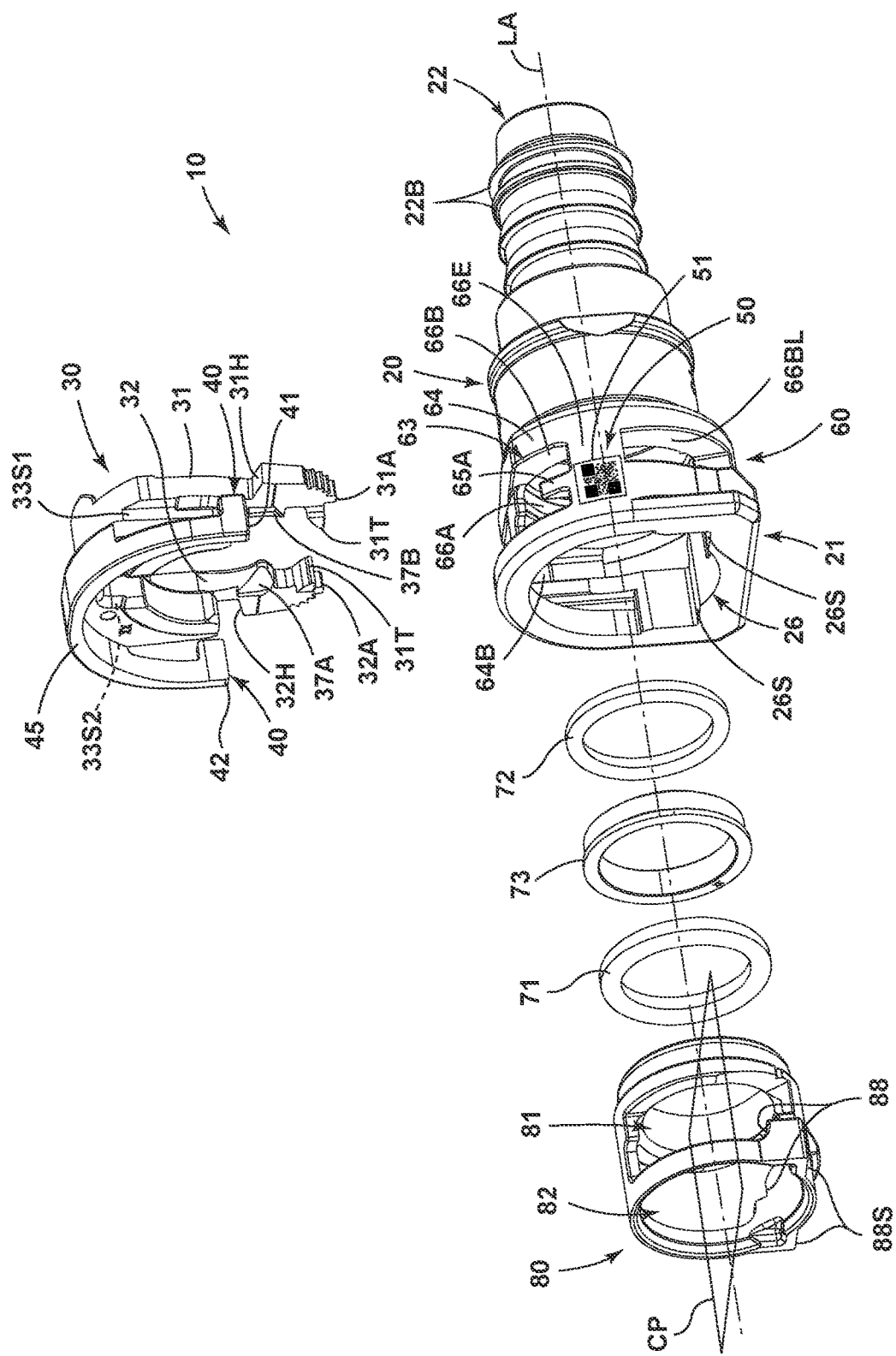
FIG. 1 is an exploded perspective view of a quick connector of a current embodiment.

A current embodiment of the quick connector is shown in FIGS. 1-9 and generally designated 10. The quick connector 10 can include a connector body 20 and a locker 30 slidably interfaced with the connector body 20, moveable from an unlocked or pre-lock mode shown in FIGS. 2-5 to a locked mode shown in FIGS. 6-9. The projection of the locker 30 from the body 20 in the unlocked mode as shown can indicate to a user or provide a primary visual verification that the locker is not locked, and that a connection between the quick connector and another component, for example, a connector that fits within the port 26 of the quick connector 10, is not complete or sufficient, or otherwise is unacceptable for some reason. The recessed and low-profile configuration of the locker relative to the body in the locked mode shown can provide another primary visual verification that the locker 30 is indeed locked, and that the connection is complete, sufficient or otherwise acceptable for some reason. Generally, the locker 30 and its configurations or positions to provide the primary visual verification can sometimes be referred to herein as the primary visual verification feature.

The connector 10 in this embodiment also can include a secondary visual verification feature, which can be implemented via one or more wings 40, for example first and second wings 41, 42, that are selectively positionable over and relative to one or more verification indicia 50, for example first and second verification indicia 51, 52, depending on the configuration of the locker 30 relative to the connector body 20 and more particularly depending on whether the locker is in the unlocked mode shown in FIGS. 2-5 or the locked mode shown in FIGS. 6-9. The secondary visual verification feature, for example, the verification indicia 50, optionally can be machine-readable or human-readable. This secondary visual verification feature can augment or supplement the primary visual verification feature where the primary visual verification feature is present and/or used in a verification protocol. Of course, in other constructions where the primary visual verification feature is absent, the secondary visual verification feature can provide its own singular verification of the status of the connector in the unlocked or locked mode, or some other mode, state or condition, depending on the application. Although referred to as primary and secondary verification features, this is not indicative of the relative significance, importance or inclusion of these features in the current embodiment.

The connector 10 of the current embodiment is described herein in connection with fuel lines and connections made between adjacent or other fuel lines in series or some other configuration. Of course, the connector herein can be used in a variety of other applications, including but not limited to connections between fuel vapor lines, fuel tank filler necks, in-tank fuel applications, diesel leak-off rails, brake lines, power steering lines, hydraulic lines, liquid transfer lines, heated lines, coolant lines, and the like, as well as a variety of thermal management solutions for HVAC, engine and EV battery cooling systems. The connector can be used in many applications, such as automotive, truck and off-road vehicles, two- and three-wheel vehicles, agricultural, industrial and other fluid delivery systems.

Various features of the connector 10 will now be described in further detail. As shown in FIG. 1, the connector body 20 can include a fluid input end 26 and a fluid output end 22 defining a fluid passageway therebetween. The fluid input end 21 is configured to receive a portion of a fluid line, hose, conduit or other elongated tubular member, commonly referred to herein as a fluid line in a sealed manner. The fluid line can include a male connector that can be inserted into the fluid input end 21. Optionally, such a male connector can be male end of a SAE J2044 quick connect fitting (or other fitting). Of course, although described as an input end, that end 21 also can be alternatively an output end and is not meant to limit the direction of flow into or out from the connector 10. The connector body 20 can further include a collar 60 that optionally can define a portion of a transverse opening 63 as described below for receiving the locker 30 in a sliding and/or otherwise movable configuration.

The fluid output end 22 can include one or more barbs 22B that can be used to connect to a second fluid line, which can be similar to the first fluid line above, or some other component. Of course, although shown as including a barbs 22B, that output end 22 could be alternatively configured to include a similar connection element including a collar and generally mirroring the fluid input end construction. In other embodiments, other types of fluid or hose connections can be used so the connector 10 can be connected to other hoses, conduits, components, reservoirs, etc. Further, although shown as a straight-line fluid connector, the fluid output end 22 alternatively can be constructed in a 900 elbow or other orientation relative to the longitudinal axis LA of the connector 10. The connector 10 and its components can be formed from any suitable material, optionally a durable, chemical-resistant and lightweight polymer, composite, alloy or other materials.

As also shown in FIG. 1, the connector collar 60 can include a sidewall 64 that defines a transverse opening 63 36 and that bears a verification indicia 50. The transverse opening 63 can be shaped to receive the sliding lock 30 in a manner described below. The verification indicia 50 can include a machine readable or machine scannable indicia, while in other embodiments the verification indicia 22 is not machine readable and instead includes a color, a pattern, an icon, or other feature so a human can visually perceived, see and/or read the indicia, indicating that the connector sliding lock is fully engaged and the connection is adequately established between the connector and a fluid line.

Optionally, the verification indicia 50 can be present as one, two, three or more verification indicia, such as first 51 and second 52 verification indicia, which can generally oppose one another or can be angularly offset from one another across the bore or opening 26 and across the longitudinal axis LA of the body 20. In some cases, the indicia 50 can be offset between 60 degrees and 120 degrees, further optionally about 180 degrees. The verification indicia 50 can have various forms in different embodiments. The verification indicia 50 can be a two-dimensional machine-readable code, optionally having a black and white pattern, such as quick response (QR) codes, barcodes, magnetic stripes, RFID tags and other formats that can be processed by a computer or device without human intervention. The verification indicia can represent and/or encode information and data via alphanumeric elements, and can provide part indicia, part information, installation location, manufacture or installation date and time, service information or schedules, or other information. The verification indicia 50 can be marked on labels or other substrates that can be adhered on the connector 10, or that can be included directly on the quick connector 10, such as by printing or laser etching. Each verification indicia can have various shapes and sizes. In one example, the verification indicia can have a polygonal shape that can be optionally less than ten millimeters by ten millimeters in area, or five millimeters by five millimeters in area, but of course other sizes can be suitable based on the application.

In the embodiment shown in FIGS. 1-5, there can be first and second verification indicia 51 and 52 disposed on the outer surface of the collar 60. These indicia can be located near the input end 21, with the first verification indicia 51 located on one side of the body 20 or collar 60 for interaction with the first wing 41, and the second verification indicia 42 located on an opposite side of the body or collar for interaction with the second wing 42. When the first and second wings 41 and 42 move, the first and second verification indicia 51 and 52 can remain static, immovable and fixed relative to the outer surface 60E of the collar 60 and body 20.

As shown in FIG. 1, the quick connector 10 can include a primary seal 71, a secondary seal 72 and a spacer 73 positioned between the primary seal 71 and secondary seal 72. These seals can be in the form of o-rings or washers, constructed from rubber, elastomeric, polymeric or other materials. The primary and secondary seals can be selected to be chemically resistant. The seals and spacer can be compressed by the receiver 80 when engaged by a fluid line inserted in the main bore, and can inhibit or prevent leakage of fluid, for example, coolant or fuel, from the coupling between the quick connector 10 and a fluid line.

With reference to FIGS. 1-5, the receiver 80 can be disposed in a longitudinal bore 26 defined by the collar 60 and body 20. The receiver 80 can be axially moveable within the longitudinal bore 26 to seat against one or more seals disposed in the longitudinal bore of the collar or body, compressing them and providing a seal noted above. The receiver 80 can include a first slot 81 and a second slot 82, on opposite sides of the longitudinal axis, and aligned with the transverse opening 63 when the carrier is installed in the collar 60, as well as the first lock arm 31 and second lock arm 32 respectively, as described further below. The first and second slots 81, 82 can be transverse, for example, perpendicular, to a central plane CP of the receiver, which generally can bisect the receiver into upper and lower parts, as well as the longitudinal bore 26 when the receiver is installed therein. The central plane CP also can bisect the body 20, the collar 60 and other components associated with the body, into upper and lower parts. Optionally, the longitudinal axis LA can be coincident with the central plane CP.

As mentioned above, the receiver 80 can fit within the collar 60, and within the longitudinal bore 26. The collar 60 can define all or a portion of the longitudinal bore 26. The longitudinal bore 26 can include shoulders or corners 26S which can mate with corresponding corners 86S of the receiver 80 and can facilitate consistent orientation of that receiver 80 relative to the body 20 and the central plane CP. The collar 60 as mentioned above can include the transverse opening 63. This transverse opening can extend downwardly within the collar and can generally be orthogonal to the central plane CP. As illustrated, the transverse opening can include an irregular shape and can slidingly receive the locker 30 as described below. In particular, the collar can include a first 65A and second 65B guide that project inwardly into the transverse opening 63. This first and second guide, sometimes referred to as guide blocks or guide tabs herein, can project inwardly toward the longitudinal axis LA. The first and second guides 65A and 65B can separate the transverse opening into a forward receiving port 66A and a rearward receiving port 66B. The rearward port 66B can receive the lock arms 31 and 32 and can extend to the exterior surface 60E in an upper part and in a lower part of the collar such that the portions of the lock arms 31 and 32, for example, their free ends, extend out from the lower parts 66BL of the ports and are visible there. As described below, the free ends of the lock arms 31 and 32 can move axially in direction A, as shown for example in FIG. 2, when the quick connector 10 is installed relative to a fluid line.

Returning to FIGS. 1-3, the forward port 66A and rearward port 66B, can be separated by the guides 65A and 65B on opposing sides of the longitudinal axis LA, and can be configured to receive parts of the locker 30. In particular, the base 33 of the locker can be configured to project into and be placed within the transverse opening 63 with parts of the locker secured to the base 33 extending into each of the specific ports 66A and 66B. The base also can include first 33S1 and second 33S2 guide slots, which can be reproduced on opposing sides of longitudinal axis LA. The first and second guides 65A and 65B can fit within the respective first 33S1 and second 33S2 guide slots. This interaction of the guides within the guide slots can guide the locker 30 generally linearly downward in direction B when the locker 30 moves upon insertion of a corresponding fluid line connector in the fluid input end 21.

Optionally, the wings 40 and arms 31, 32 can have particular orientations relative to the guides 65A and 65B, as well as the guide slot 33S1 and 33S2. For example, the wings 40 can be joined with the base generally forward of the guide slots 33S1 and 33S2. All or a portion of the free ends or flags 43, 44, associated with the respective wings 41 and 42, also can be located forwardly of the guide and guide slots. The wings 41, 42 can be located forward of the forward port 66A with a portion of the free ends or flags 43, 44 extending rearward and overlapping a portion of the forward port 66A. Further, the first and second lock arms 31, 32 can be joined with the base and can extend downward and rearward therefrom, generally rearward of the guide slots 33S1, 33S2 and guides 65A, 65B.

Turning now to the locker 30, that component can be operable in an unlocked or pre-locked state or mode, depending on whether a fluid line has been inserted in the fluid input end 21. For example, the sliding locker is operable in an unlocked mode, shown in FIGS. 2-5, in which the base 33 at least partially protrudes a distance D1 from the body 20 and from the transverse opening 63. In this mode, the base supports the first 41 and second 42 wings in a first position in which the first and second wings partially and/or wholly obstruct the first 51 and second 52 verification indicia, thereby inhibiting at least one of reading and scanning of those verification indicia. The locker 30 is further operable in a locked mode as shown in FIGS. 6-9. In this locked mode, the base 33 is inserted farther into the transverse opening 63 and the body 20. When in the unlocked mode, the base 33 supports the first and second wings 41, 42 in a second, lowered position, farther away from the upper surface 60U of the collar 60. The base supports the first and second wings 41, 42 in the second position in which the first and second wings allow the reading and enter scanning of the verification indicia 51, 52.

Figure 2:
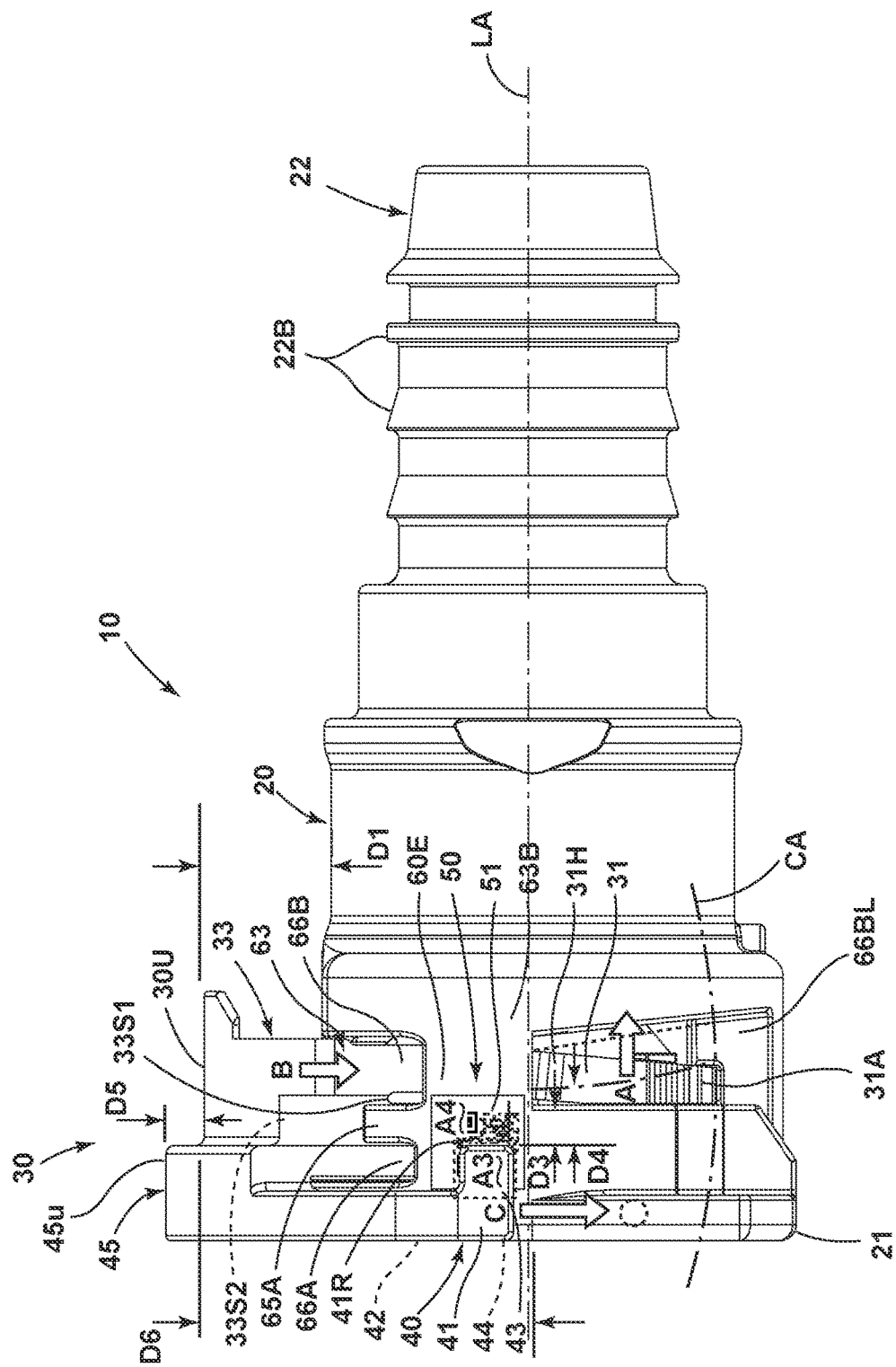
FIG. 2 is a side view of the quick connector in an unlocked mode, with a wing at least partially obstructing verification indicia.
Figure 3:
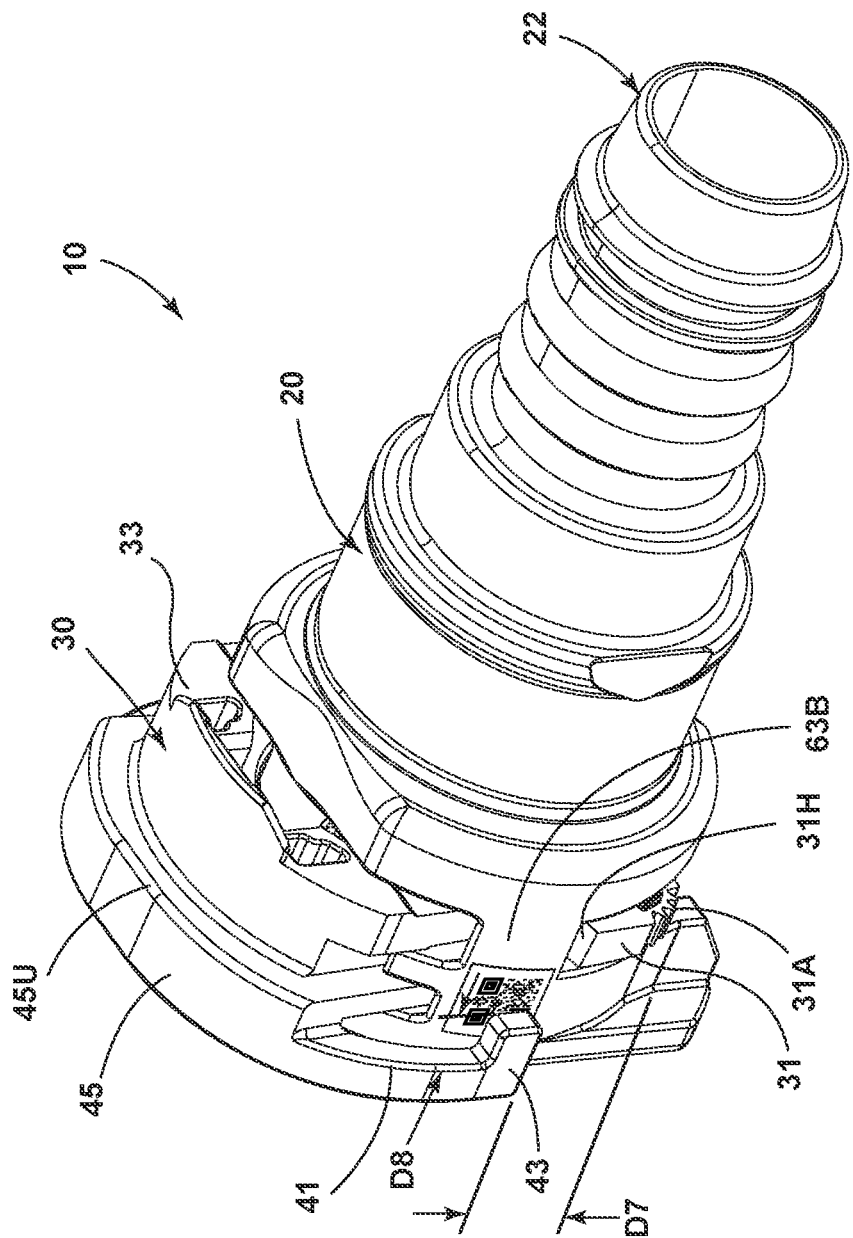
FIG. 3 is a rear perspective view of the quick connector in the unlocked mode with the wing at least partially obstructing the verification indicia.
Figure 4:
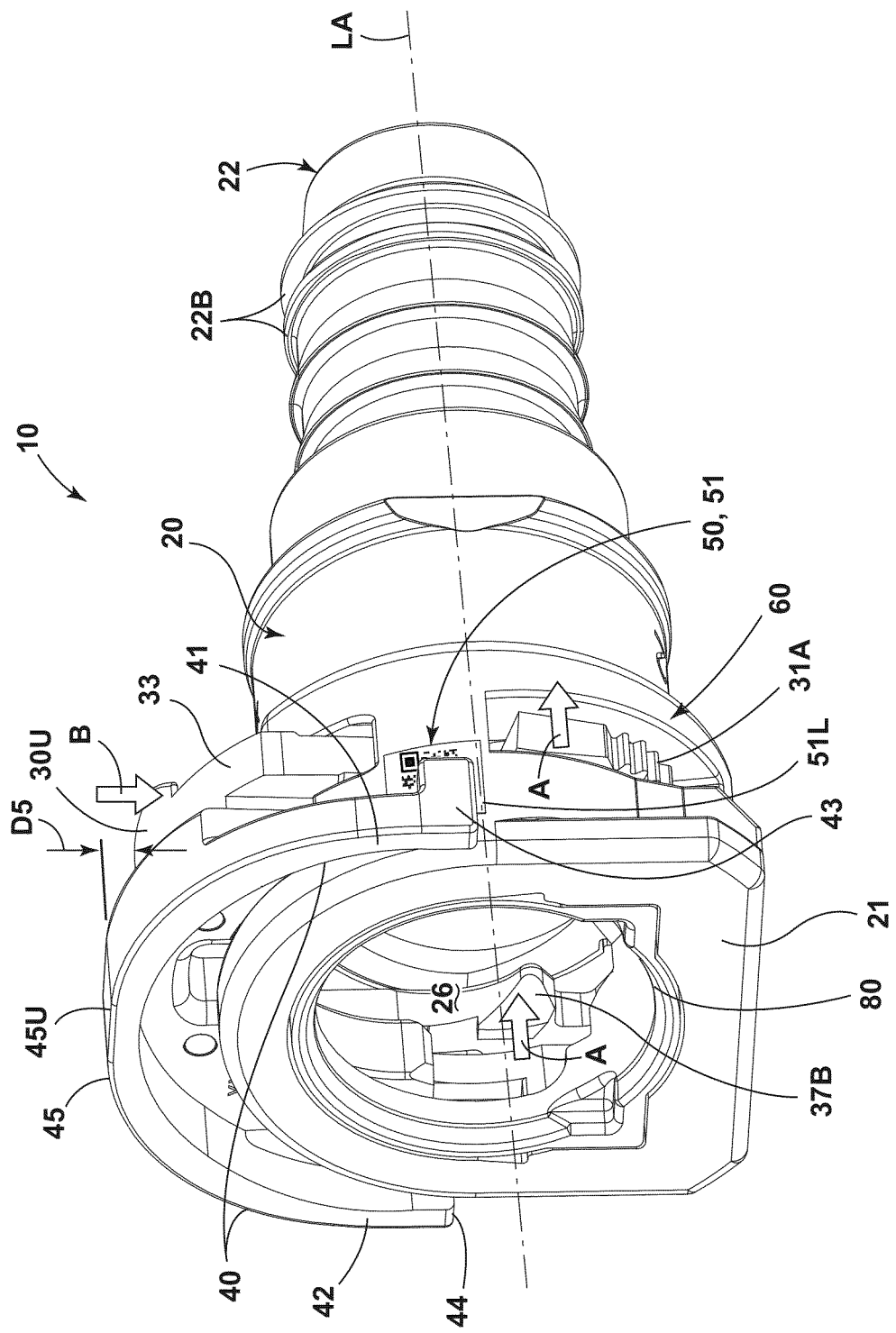
FIG. 4 is a front perspective view of the quick connector in the unlocked mode with the wing at least partially obstructing a verification indicia.
Figure 5:
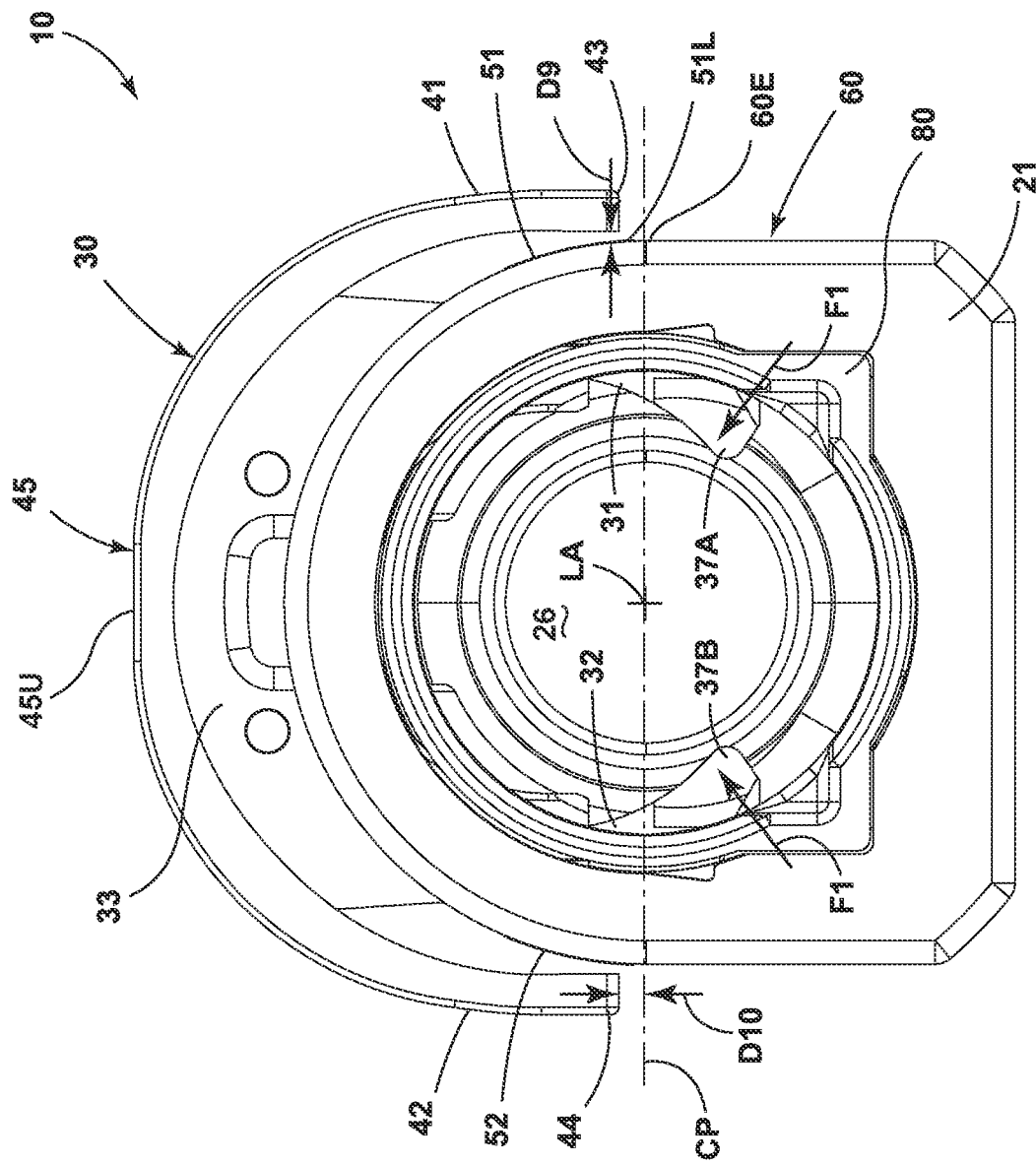
FIG. 5 is an end view of the quick connector in the unlocked mode with the wing at least partially obstructing a verification indicia.

With reference to FIGS. 1-5, the locker 30 can include the base 33, a first lock arm 31, a second lock arm 32 and an armature 45 including the wings 40, such as a first wing 41 and a second wing 42. Although the current embodiment is described with two lock arms, two wings and two verification indicia, any number of these elements can be used depending on the application. The first and second lock arms 31, 32 extend from the base 33 in a cantilevered manner and can include a first free end 31A and a second free end 31B. Each of the lock arms, in particular the respective free ends thereof, can include an interference tab 31T that can interface with a interference retainer 31R as shown for example in FIGS. 6 and 7 in the locked mode, holding the locker in place. Each of lock arms 31, 32 also can include a hook 31H, 32H that can interface with the bridge portion 63B of the collar 60 to partially retain the locker 30 in the transverse opening 63. Each of the respective arms can include respective first and second actuator projections 37A and 37B, which project inwardly into the longitudinal bore 26 of the body 20. These first and second actuator projections are configured and oriented as shown in FIG. 5 to receive a force F1 from a connector being inserted into the first fluid end 21. As that force F1 is received by the actuator projections 37A and 37B, the force is transferred to the respective first and second 31 and 32 lock arms. As a result, as shown in FIGS. 2 and 4, the first and second lock arms move axially in direction A, generally parallel to the longitudinal axis LA, but moving slightly along a curved arc CA. For example, the cantilevered free end 31A of the respective arm 31 moves along that curved arc. Optionally, although this motion of the lock arms can be axial and along a curved arc, it still can be referred to as an axial movement. Of course, axial movement also can encompass a purely axial movement where the arms move only linearly aligned with or parallel to the longitudinal axis LA. As the locker arms move, the locker can transition from the unlocked mode shown in FIG. 2 to the locked mode shown in FIG. 6. As it does so, the locker 30, and its components such as the base and locking rim 33LR shown in FIG. 9 moves downward in direction E and locks adjacent a corresponding projection rim or ring of a male connector inserted in the bore 26 or generally connected to the quick connector 10. In turn, this engages and locks the male connector in place in relation to the locker and collar, with a secure leak-free connection established.

In transitioning from the unlocked mode to the locked mode, the lock arms 31 and 32 can deflect axially rearward, sliding over and relative to interference tabs 88 of the receiver 80 until they freely pass beyond those tabs, allowing the arms to slide down within the transverse opening in the respective rearward port 66B. The force F1 on the respective actuator projections 37A, 37B can cause the automatic movement of the locker in direction B shown for example in FIG. 2. After the interference tab 31T of the arm 31 extends below the interference retainer 31R on the collar, the arm can lock in place and secure the locker in the locked mode.

Optionally, as can be seen in FIG. 2, during the axial movement in direction A of the lock arms, for example lock arm 31, that lock arm can move axially away from the first wing 41. For example, initially, in the unlocked mode, the first lock arm 31 is shown in solid lines. The rearward edge 41R of the wing 41 can be a distance D3 from that first lock arm 31. As the locker transitions in direction B from the unlocked mode shown in FIG. 2 to the locked mode shown for example in FIG. 6, the lock arm 31 can move axially and bends or flexes in direction A. As this occurs, the distance between the rearward edge 41R of the wing 41 increases to a greater distance D4. After the locking arm attains a locked mode shown for example in FIG. 6, after the transition is complete, the lock arms 31, 32 move axially forward in direction A2 back toward the fluid input end 21 and generally toward the wings 40. The distance from the rearward edge 41R to the lock arm 31 can be reduced back to the distance D3 or some other distance almost the same as D3.

The locker 30 also can include the armature 45 as described above and shown in FIGS. 1-5. The armature 45 can include the wings 40, in particular the first wing 41 and second wing 42, extending on opposite sides of the longitudinal axis LA. The armature 45 can be integrally and immovably joined with the base 33, and can form an integral portion of the locker 30. These components can be molded, formed or otherwise produced as a single piece unit, constructed from a homogeneous material extending throughout the locker, the base and the armature and their respective components. The armature 45 and the base 33 can be static and can remain static relative to one another throughout all operations in the unlocked mode and the locked mode, as well as transitioning from the unlocked mode to the locked mode and vice versa. These components can move together in unison simultaneously with one another. Likewise, the first and second lock arms, as well as the first and second wings can move in unison with one another, although the lock arms can move axially away from the wings during the simultaneous downward movement.

Figure 6:
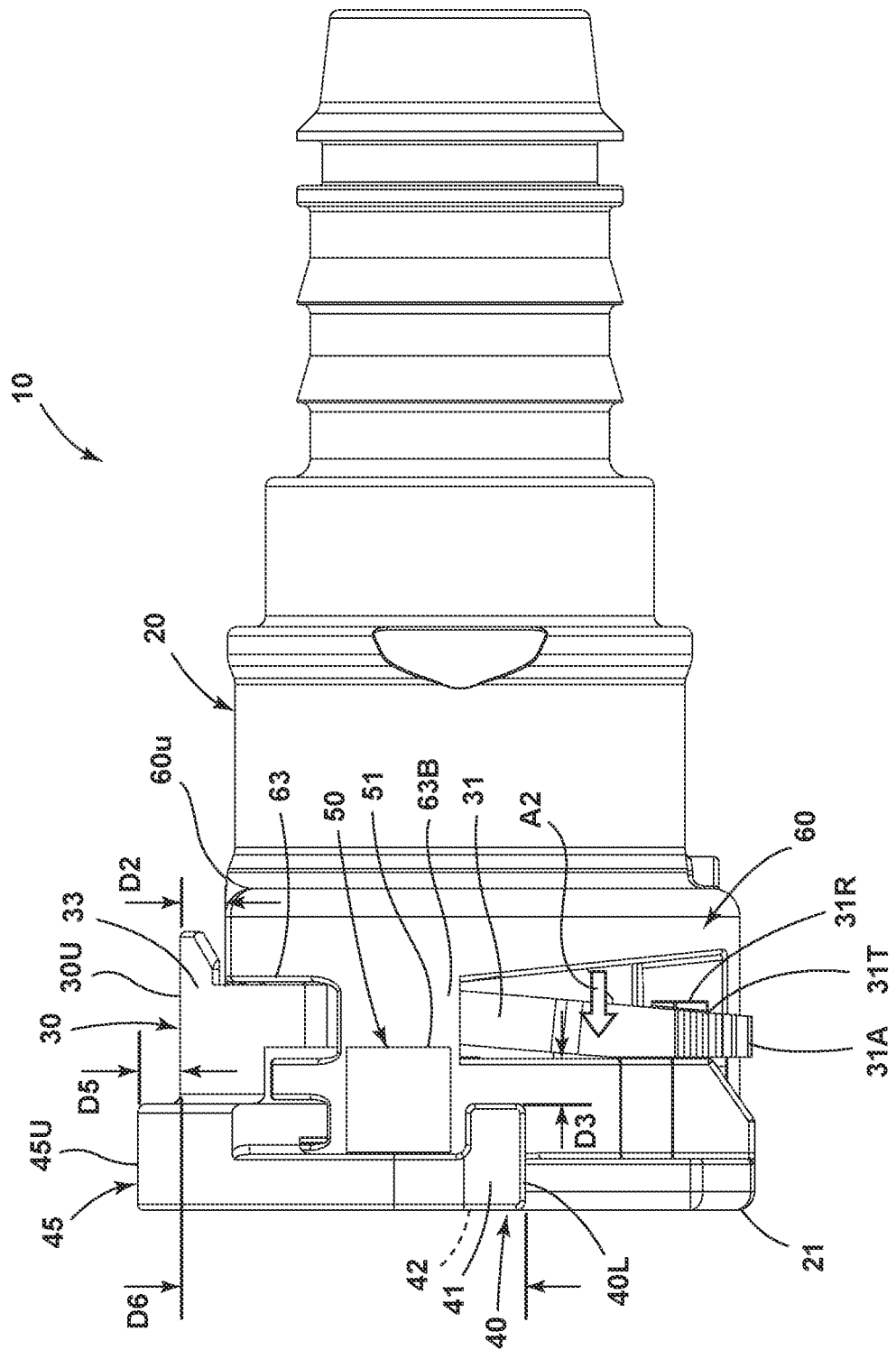
FIG. 6 is a side view of the quick connector in a lock mode with the wing moved to expose the verification indicia.
Figure 7:
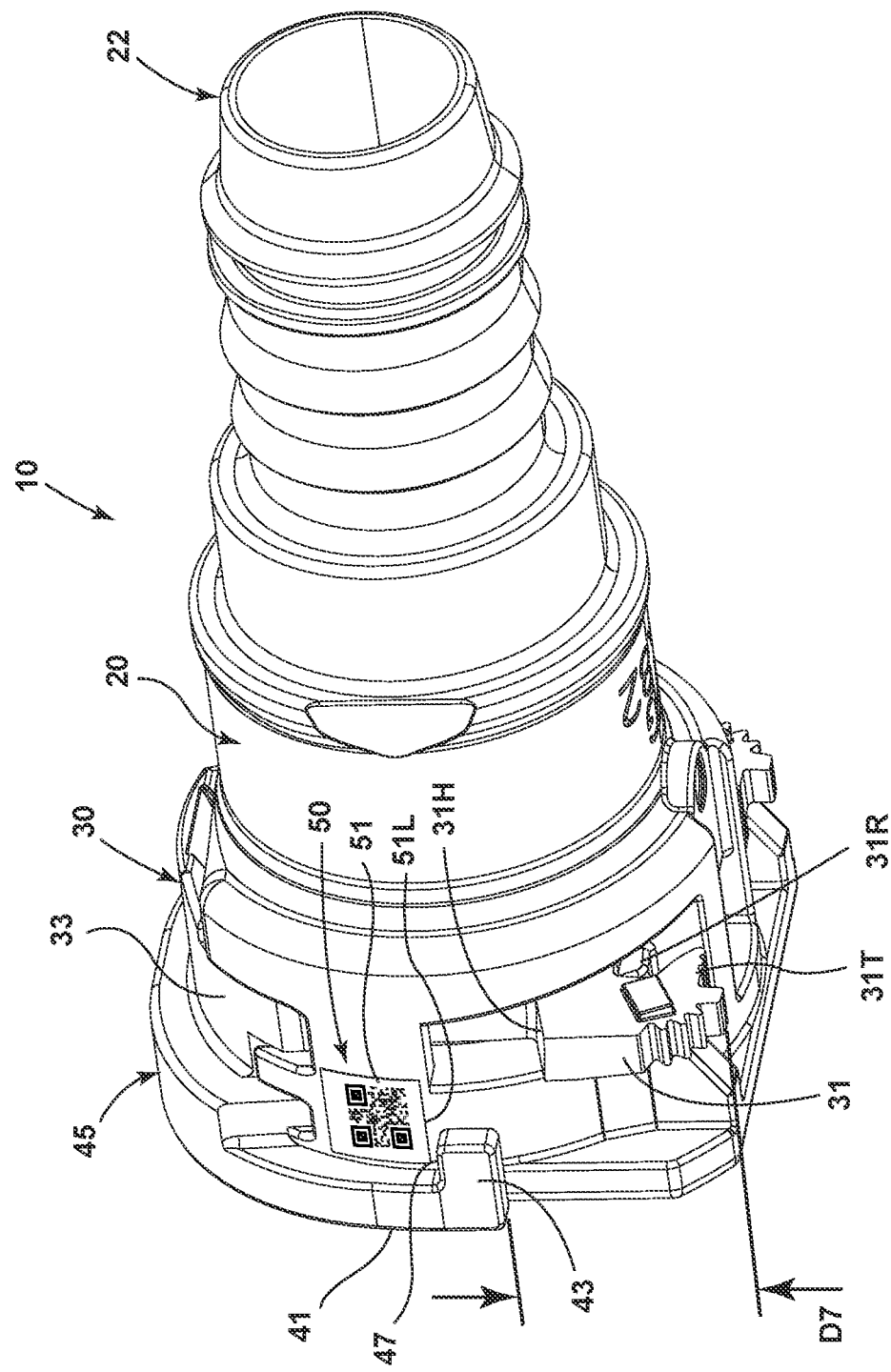
FIG. 7 is a rear perspective view of the quick connector in the lock mode with the wing moved to expose the verification indicia.
Figure 8:
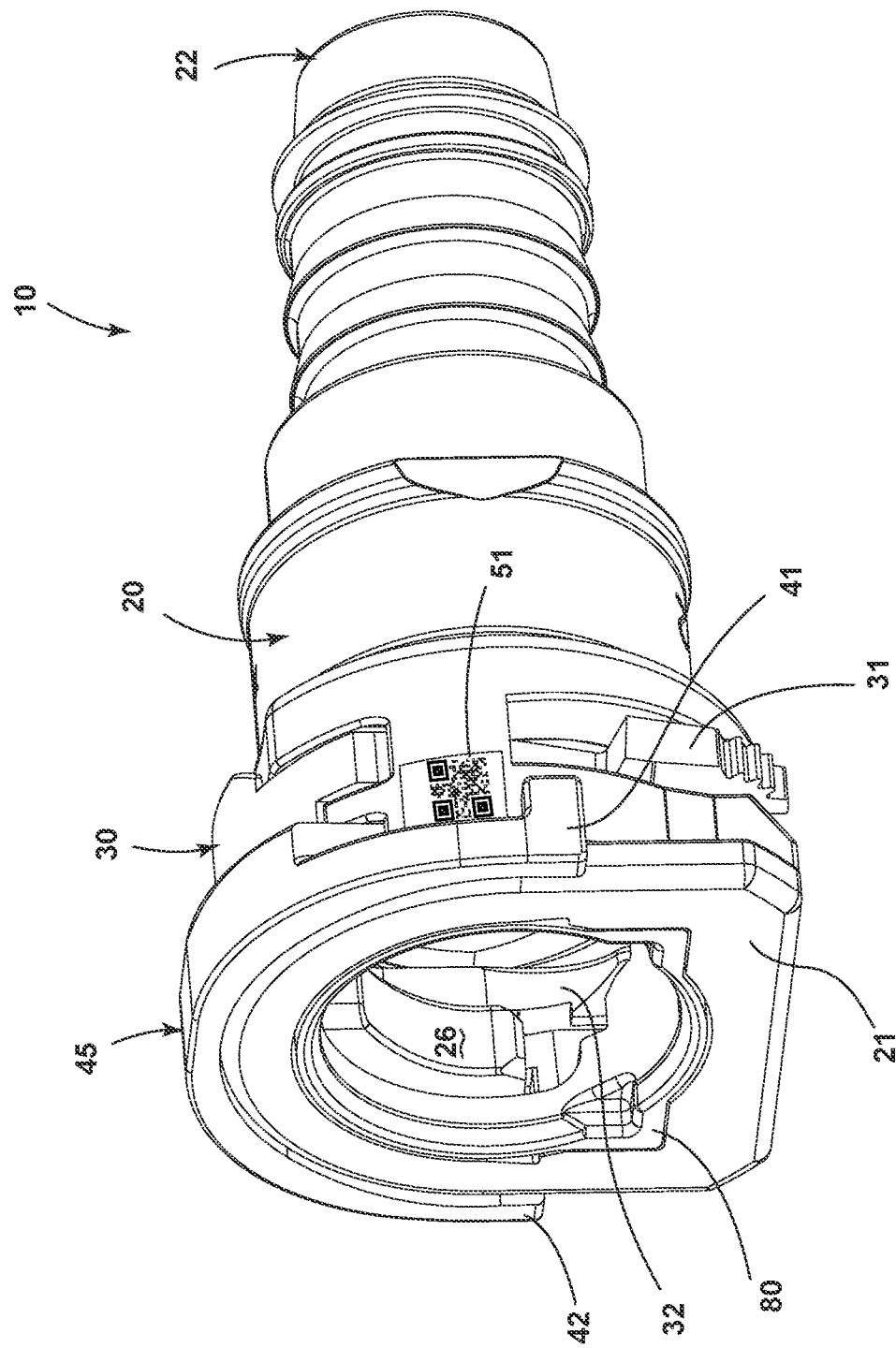
FIG. 8 is a front perspective view of the quick connector in the lock mode with the wing moved to expose the verification indicia.

As shown in FIGS. 2 and 6, the armature 45 can include an armature upper surface 45U, which optionally can be the uppermost surface of that armature. The locker 30 can include a locker upper surface 30U, which optionally can be the uppermost surface of the base 33. The armature upper surface 45U can remain at a constant distance D5 from the base upper surface or locker upper surface 30 in both the unlocked mode shown in FIG. 2 and the locked mode shown in FIG. 6. This can occur because again, the armature 45 and the remainder of the locker 30, can be a single piece unit, integrally and immovably joined with one another. Due to the integral construction of the base 33 and the armature 45, the lowermost portion 40L of the wings 41 and 42 also can remain a fixed distance D6 from the upper surface 30U of the locker and/or base 33 in both the unlocked mode shown in FIG. 2 and the locked mode shown in FIG. 6. Again, optionally the distances D5 and D6 do not change from one mode to the next or during transition of the locker to the different modes.

Further optionally, the spatial relationship between the wings 41, 42 can remain the same in the locked and unlocked modes. For example, with reference to FIGS. 3 and 7, the first wing 41 can extend to a free end 43 optionally in the form of a flag. The free end 43 can be disposed above a free end 31A of the first arm 31. Conversely, the first arm free end 31A can be disposed below the free end 43 of the first wing 41. These components can be disposed the vertical distance D7 away from one another. This vertical distance D7 can remain the same in both the unlocked mode and the locked mode and can remain unchanged in the transition from the unlocked mode to the locked mode. The distance between these free ends also optionally does not change even though the distance between these elements and the central plane CP and/or the longitudinal axis can change. It will be appreciated, however, that the horizontal or axial distance between the rearward edge 41R of the wing 41 can change relative to the lock arm 31 as it bends in direction A, for example, as shown in FIG. 2 and as described herein.

With reference to FIGS. 3-5, the armature 45 can include the first and second wings 41, 42. These wings can extend outwardly on opposing sides of the longitudinal axis LA in an arching and/or angled manner to the free ends or flags 43, 44 of those wings. At the free ends, the flags can project outwardly a distance D8 from the main parts of the wings 40. The wings and the free ends 43, 44 can be spaced a distance D9 from the outer surface 60E of the collar 60. This distance optionally can be less than 1 mm, less than 2 mm, less than 3 mm, less than 4 mm, less than 5 mm, or other distances depending on the application. Further optionally, the free ends 43, 44 do not touch, engage or drag against the outer surface 60E of the collar 60 when the locker 30 is moved from the unlocked mode shown in FIGS. 2-5 to the locked mode shown in FIGS. 6-9.

Figure 9:
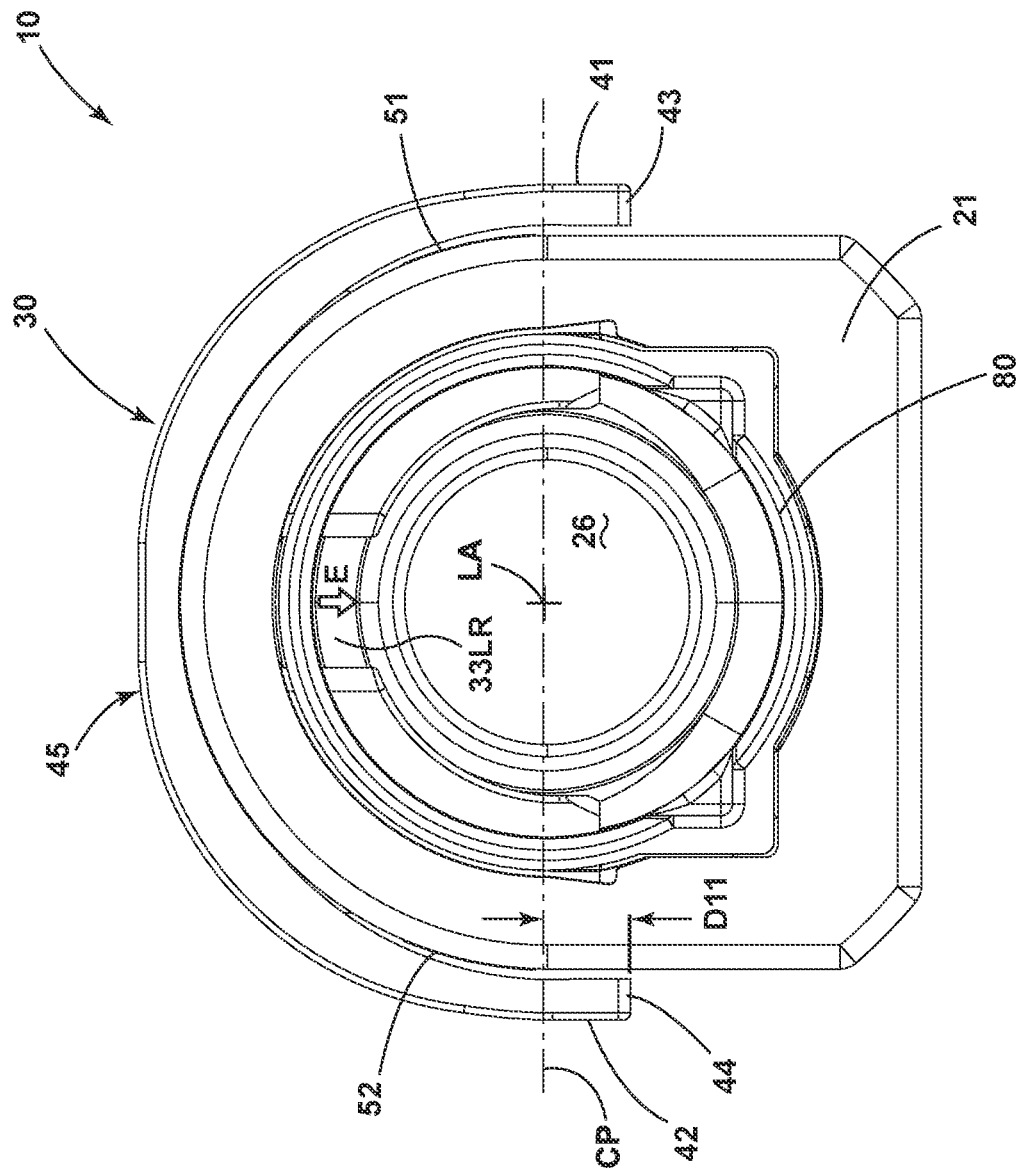
FIG. 9 is an end view of the quick connector in the unlocked mode with the wing moved to expose the verification indicia.

Optionally, as shown in FIGS. 5 and 9, the spatial relationship of the wings 41, 42 relative to the verification indicia 51, 52 as well as the central plane CP and longitudinal axis LA of the collar 30, longitudinal bore 26 and/or receiver 80 can vary from the unlocked mode to the locked mode. For example, as shown in FIG. 5, the first and second wings, in particular, the ends 43 and 44 can be disposed on opposite sides of the collar 30 and the receiver 80. The first and second wings can extend above the central plane CP a distance D10. The verification indicia 51, in particular, a lower edge 51L of the indicia, can be closer to the central plane CP than the free end 43 of the first wing 41. The same can be true for the second free end of the second wing 42. When the armature 45 and locker 30 transition to the locked mode shown in FIG. 9, the free ends 43 and 44 of the wings 41 and 42 can extend a distance D11 below the central plane CP. The free end 43 and/or lowermost portion of that wing 41 also can extend below the central plane CP by the distance D11. The distance D11 optionally can be greater than the distance D10 mentioned above in the unlocked mode. The uppermost portion 47 of the free end 43, shown for example in FIG. 7 can be disposed between below the lowermost portion 51L of the first verification indicia 51. Accordingly, the wing no longer obstructs the first verification indicia 51 so that it can be scanned or read by machine or human. Of course, the distances D10 and D11 can be altered, and the orientation of the wing free ends 43 and 44 relative to the central plane CP can vary depending on the application and the positioning of the respective verification indicia 51 and 52.

As mentioned above, in the unlocked mode, shown for example in FIG. 2, the wings 40 can obstruct all or a portion of the respective verification indicia 50. As an example, the wing 41, and optionally the free end or flag 43 can obstruct, conceal, or otherwise make unreadable or unscannable by machine or human in area A3 of the first verification indicia 51. The remaining area A4 of the verification indicia 51 can be visible. However, that area A4 can be insufficient to provide enough data for an adequate reading or scan by human or machine to verify that the locker 30 has been sufficiently moved from the unlocked mode to the locked mode and/or that a fluid line is properly connected to the connector 10. The area A3 optionally can be at least 10%, at least 20%, at least 30%, at least 40%, at least 50%, at least 60%, at least 70%, at least 80%, at least 90% or 100% of the total exposed surface area of the first verification indicia 51. Of course, other specific percentages can be selected depending on the particular reading and/or scanning of the verification indicia 51. The remaining area A4 can be the balance of the total area of the verification indicia 51, minus the area A3 that is obstructed or concealed by the wing 41. It will further be appreciated that although shown as polygonal shaped, the wings and the verification indicia can be of a variety of different shapes and dimensions, depending on the application.

A method of using the connector 10 of the current embodiment will now be described. In general, the method can include providing a connector body including a longitudinal axis and a collar configured to receive a fluid line, the collar including an outer surface and defining an opening transverse to the longitudinal axis, with a verification indicia fixedly and immovably disposed on the outer surface of the collar; installing a sliding locker relative to the connector body, the sliding locker including a base including a lock and an armature fixedly joined with the base, the armature including a wing extending along the collar and spaced from the outer surface of the collar, the sliding locker being initially configured in an unlocked mode in which a base of the locker at least partially protrudes from the transverse opening, and supports the wing joined in a first position in which the wing obstructs the verification indicia thereby inhibiting at least one of reading and scanning of the verification indicia. The sliding locker can be configured to transition from the unlocked mode to a locked mode in which the base of the locker is inserted farther into the transverse opening than in the unlocked mode and supports the wing in a second position in which the wing allows at least one of reading and scanning of the verification indicia. The base, lock arm, armature and wing all simultaneously move in unison with one another when the sliding locker is transitioned from the unlocked mode to the locked mode. The method can include transitioning the sliding locker from the unlocked mode to the locked mode, and axially bending the lock arm during the transitioning so that the lock arm moves generally axially away from a free end of the wing.

More particularly, the method can begin with providing the quick connector 10 in the unlocked or pre-locked mode as shown in FIGS. 2-5. There, the locker 30 is in the locked position or mode. The receiver 80 is disposed in the bore 26. The respective seals 71, 72 and spacer 73 are also in the bore but generally in an uncompressed state. The lock arms 31 and 32 are in the respective port 66B of the transverse opening 63. The locker 30 can be held in place by respective lock arms. The projecting actuators 37A and 37B can extend inwardly toward the longitudinal bore 26. The verification indicia 50 can be obstructed or concealed at least partially by the respective wings 40. In this configuration, these verification indicia 50 cannot be read or scanned by machine or human.

A fluid line (not shown) can be inserted into the fluid input end 21 of the connector 10. This fluid line can include a male connector in compliance with SAE J2044. The male connector can engage the receiver 80 and fully seated against the seals 71, 72 and spacer 73. As this occurs, the connector also engages the actuating projections 37A, 37B with a force F1. This bends the lock arms, moving them axially as described above.

In turn, this causes the locker 30 to automatically slide downward in the opening. As this occurs, the base and locking arms moved downward in direction B and simultaneously the wings 40 also move downward in direction C as shown in FIG. 2. Again, the lock arms can move farther axially in direction A and optionally along the curved arc CA. While this occurs, the armature, wings, base and locker in general all move in unison because they are all connected and integral with one another. The locker 30 continues to move downward until the lock arms engage and lock with the components as described above holding the locker in place. The wings also can move relative to the outer surface 60E of the collar 60 until they no longer obstruct and/or conceal the verification indicia 50. When this occurs, these indicia can be read or scanned by human and/or machine to confirm that the locker is adequately in place and the fluid connection between the fluid connector 10 and the fluid line has been completed and established in a leak free and satisfactory manner.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function, does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A quick connector comprising:
   a connector body including a longitudinal axis and a collar configured to receive a fluid line, the collar including an outer surface and defining a transverse opening to the longitudinal axis, the collar including a height extending from an upper part to a lower part of the collar;
   a first verification indicia fixedly and immovably disposed on the outer surface of the collar; and
   a sliding locker including a base, a first lock arm and a second lock arm, the base including an armature integrally and immovably joined with the base, the armature including a first wing extending downward at least a portion of the height from the upper part of the collar, the first wing spaced from the outer surface of the collar, wherein the first lock arm, second lock arm, and first wing are simultaneously moveable in unison with one another;
   wherein the sliding locker is operable in an unlocked mode in which the base at least partially protrudes from the transverse opening and supports the first wing in a first position in which the first wing obstructs the first verification indicia thereby inhibiting at least one of reading and scanning of the first verification indicia,
   wherein the sliding locker is operable in a locked mode in which the base is inserted farther into the transverse opening than in the unlocked mode and supports the first wing in a second position in which the first wing allows at least one of reading and scanning of the first verification indicia,
   wherein the first wing includes a first wing free end,
   wherein the first lock arm includes a first arm free end,
   wherein the first arm free end is disposed a first distance below the first wing free end,
   wherein the first distance remains the same in both the unlocked mode and in the locked mode.

2. A quick connector comprising:
   a connector body including a longitudinal axis and a collar configured to receive a fluid line, the collar including an outer surface and defining a transverse opening to the longitudinal axis, the collar including a height extending from an upper part to a lower part of the collar;
   a first verification indicia fixedly and immovably disposed on the outer surface of the collar; and
   a sliding locker including a base, a first lock arm and a second lock arm, the base including an armature integrally and immovably joined with the base, the armature including a first wing extending downward at least a portion of the height from the upper part of the collar, the first wing spaced from the outer surface of the collar, wherein the first lock arm, second lock arm, and first wing are simultaneously moveable in unison with one another;
   wherein the sliding locker is operable in an unlocked mode in which the base at least partially protrudes from the transverse opening and supports the first wing in a first position in which the first wing obstructs the first verification indicia thereby inhibiting at least one of reading and scanning of the first verification indicia,
   wherein the sliding locker is operable in a locked mode in which the base is inserted farther into the transverse opening than in the unlocked mode and supports the first wing in a second position in which the first wing allows at least one of reading and scanning of the first verification indicia,
   wherein, in transitioning from the unlocked mode to the locked mode, the first lock arm moves axially away from the first wing.

3. A quick connector comprising:
   a connector body including a longitudinal axis and a collar configured to receive a fluid line, the collar including an outer surface and defining a transverse opening to the longitudinal axis, the collar including a height extending from an upper part to a lower part of the collar;
   a first verification indicia fixedly and immovably disposed on the outer surface of the collar; and
   a sliding locker including a base, a first lock arm and a second lock arm, the base including an armature integrally and immovably joined with the base, the armature including a first wing extending downward at least a portion of the height from the upper part of the collar, the first wing spaced from the outer surface of the collar, wherein the first lock arm, second lock arm, and first wing are simultaneously moveable in unison with one another;
   wherein the sliding locker is operable in an unlocked mode in which the base at least partially protrudes from the transverse opening and supports the first wing in a first position in which the first wing obstructs the first verification indicia thereby inhibiting at least one of reading and scanning of the first verification indicia,
   wherein the sliding locker is operable in a locked mode in which the base is inserted farther into the transverse opening than in the unlocked mode and supports the first wing in a second position in which the first wing allows at least one of reading and scanning of the first verification indicia,
   a longitudinal bore defined by the collar and extending along the longitudinal axis;
   a receiver disposed in the longitudinal bore and including a first slot and a second slot, wherein both the first slot and the second slot are aligned with the transverse opening and aligned with the first lock arm and second lock arm respectively, wherein the receiver is axially moveable within the longitudinal bore to seat against a seal disposed in the longitudinal bore.

4. The quick connector of claim 3, wherein the first slot and the second slot extend perpendicular to the longitudinal axis and parallel to the transverse opening, wherein the first lock arm extends from the base in a cantilevered manner and includes a first free end, wherein the second lock arm extends from the base in a cantilevered manner and includes a second free end, wherein the first lock arm is axially, bendably disposed in the first slot in the unlocked mode, wherein the second lock arm is axially, bendably disposed in the second slot in the unlocked mode, wherein the first lock arm includes a first actuator projection projecting inward toward the longitudinal axis in the unlocked mode and configured to receive a force from a connector entering the collar and transfer that force to bend the first lock arm away from an opening of the collar in transitioning from the unlocked mode to the locked mode.

5. The quick connector of claim 4, wherein the collar includes a first guide projecting into the transverse opening, wherein the base includes a first guide slot, wherein the first guide projects into the first guide slot, wherein the first wing is joined with the base forward of the first guide slot, wherein the first lock arm is joined with the base rearward of the first guide slot.

6. A quick connector comprising:

a connector body including a longitudinal axis and a collar configured to receive a fluid line, the collar including an outer surface and defining a transverse opening to the longitudinal axis, the collar including a height extending from an upper part to a lower part of the collar;

a first verification indicia fixedly and immovably disposed on the outer surface of the collar; and a sliding locker including a base, a first lock arm and a second lock arm, the base including an armature integrally and immovably joined with the base, the armature including a first wing extending downward at least a portion of the height from the upper part of the collar, the first wing spaced from the outer surface of the collar, wherein the first lock arm, second lock arm, and first wing are simultaneously moveable in unison with one another;

wherein the sliding locker is operable in an unlocked mode in which the base at least partially protrudes from the transverse opening and supports the first wing in a first position in which the first wing obstructs the first verification indicia thereby inhibiting at least one of reading and scanning of the first verification indicia, wherein the sliding locker is operable in a locked mode in which the base is inserted farther into the transverse opening than in the unlocked mode and supports the first wing in a second position in which the first wing allows at least one of reading and scanning of the first verification indicia, wherein the collar includes a first guide projecting into the transverse opening, wherein the base includes a first guide slot, wherein the first guide projects into the first guide slot, wherein the first wing is joined with the base forward of the first guide slot adjacent an axial opening of the collar, wherein the first lock arm is joined with the base rearward of the first guide slot.

7. The quick connector of claim 6, wherein the armature includes a second wing opposing the first wing, wherein the armature includes an armature upper surface, wherein the sliding locker includes a locker upper surface, wherein the armature upper surface remains a constant distance from the locker upper surface in both the unlocked mode and the locked mode.

8. A quick connector comprising:

a connector body including a longitudinal axis and a collar configured to receive a fluid line, the collar including an outer surface and defining a transverse opening to the longitudinal axis, the collar including a height extending from an upper part to a lower part of the collar;

a first verification indicia fixedly and immovably disposed on the outer surface of the collar; and a sliding locker including a base, a first lock arm and a second lock arm, the base including an armature integrally and immovably joined with the base, the armature including a first wing extending downward at least a portion of the height from the upper part of the collar, the first wing spaced from the outer surface of the collar, wherein the first lock arm, second lock arm, and first wing are simultaneously moveable in unison with one another;

wherein the sliding locker is operable in an unlocked mode in which the base at least partially protrudes from the transverse opening and supports the first wing in a first position in which the first wing obstructs the first verification indicia thereby inhibiting at least one of reading and scanning of the first verification indicia, wherein the sliding locker is operable in a locked mode in which the base is inserted farther into the transverse opening than in the unlocked mode and supports the first wing in a second position in which the first wing allows at least one of reading and scanning of the first verification indicia, wherein the armature includes an armature upper surface, wherein the base includes a base upper surface, wherein the armature upper surface remains a constant distance from the base upper surface in both the unlocked mode and the locked mode, wherein the first lock arm extends in a cantilever manner from the base, wherein the first lock arm is bendable axially away from the first wing when the sliding locker transitions from the unlocked mode to the locked mode.

9. A quick connector comprising:

a connector body including a longitudinal axis and a collar configured to receive a flluid line, the collar including an outer surface and defining a transverse opening to the longitudinal axis;

a first verification indicia fixedly and immovably disposed on the outer surface of the collar;

a second verification indicia fixedly and immovably disposed on the outer surface of the collar and disposed opposite from first verification indicia across the longitudinal axis;

a sliding locker including a base, a first lock arm and a second lock arm, the base including an armature integrally and immovably joined with the base, the armature including a first wing extending downward along the collar and spaced from the outer surface of the collar, the armature including a second wing joined with the armature and disposed opposite from first wing across the longitudinal axis, the second wing extending downward along the collar and spaced from the outer surface of the collar, the first lock arm, wherein the second lock arm, the first wing and the second wing are simultaneously moveable in unison with one another;

wherein the sliding locker is operable in an unlocked mode in which the base at least partially protrudes from the transverse opening, and supports the first wing in a first position in which the first wing obstructs the first verification indicia thereby inhibiting at least one of reading and scanning of the first verification indicia, and supports the second wing in the first position in which the second wing obstructs the second verification indicia thereby inhibiting at least one of reading and scanning of the second verification indicia, wherein the sliding locker is operable in a locked mode in which the base is inserted farther into the transverse opening than in the unlocked mode and supports the first wing in a second position in which the first wing allows at least one of reading and scanning of the first verification indicia, and supports the second wing in the second position in which the second wing allows at least one of reading and scanning of the second verification indicia, wherein the armature includes an armature upper surface, wherein the sliding locker includes a locker upper surface, wherein the armature upper surface remains a constant distance from the locker upper surface in both the unlocked mode and the locked mode, wherein the first lock arm extends in a cantilever manner from the base, wherein the first lock arm is bendable axially away from the first wing when the sliding locker transitions from the unlocked mode to the locked mode.

10. The quick connector of claim 9, wherein the first wing includes a first wing free end, wherein the first lock arm includes a first arm free end, wherein the first arm free end is disposed a first distance below the first wing free end, wherein the first distance remains the same in both the unlocked mode and in the locked mode.

11. A quick connector comprising:

a connector body including a longitudinal axis and a collar configured to receive a fluid line, the collar including an outer surface and defining a transverse opening to the longitudinal axis;

a first verification indicia fixedly and immovably disposed on the outer surface of the collar;

a second verification indicia fixedly and immovably disposed on the outer surface of the collar and disposed opposite from first verification indicia across the longitudinal axis;

a sliding locker including a base, a first lock arm and a second lock arm, the base including an armature integrally and immovably joined with the base, the armature including a first wing extending downward along the collar and spaced from the outer surface of the collar, the armature including a second wing joined with the armature and disposed opposite from first wing across the longitudinal axis, the second wing extending downward along the collar and spaced from the outer surface of the collar, the first lock arm, wherein the second lock arm, the first wing and the second wing are simultaneously moveable in unison with one another;

wherein the sliding locker is operable in an unlocked mode in which the base at least partially protrudes from the transverse opening, and supports the first wing in a first position in which the first wing obstructs the first verification indicia thereby inhibiting at least one of reading and scanning of the first verification indicia, and supports the second wing in the first position in which the second wing obstructs the second verification indicia thereby inhibiting at least one of reading and scanning of the second verification indicia, wherein the sliding locker is operable in a locked mode in which the base is inserted farther into the transverse opening than in the unlocked mode and supports the first wing in a second position in which the first wing allows at least one of reading and scanning of the first verification indicia, and supports the second wing in the second position in which the second wing allows at least one of reading and scanning of the second verification indicia, wherein the collar includes a first guide projecting into the transverse opening, wherein the base includes a first guide slot, wherein the first guide projects into the first guide slot, wherein the first wing is joined with the base forward of the first guide slot adjacent an axial opening of the collar, wherein the first lock arm is joined with the base rearward of the first guide slot.

12. A quick connector comprising:

a connector body including a longitudinal axis and a collar configured to receive a fluid line, the collar including an outer surface and defining a transverse opening to the longitudinal axis;

a first verification indicia fixedly and immovably disposed on the outer surface of the collar;

a second verification indicia fixedly and immovably disposed on the outer surface of the collar and disposed opposite from first verification indicia across the longitudinal axis;

a sliding locker including a base, a first lock arm and a second lock arm, the base including an armature integrally and immovably joined with the base, the armature including a first wing extending downward along the collar and spaced from the outer surface of the collar, the armature including a second wing joined with the armature and disposed opposite from first wing across the longitudinal axis, the second wing extending downward along the collar and spaced from the outer surface of the collar, the first lock arm, wherein the second lock arm, the first wing and the second wing are simultaneously moveable in unison with one another;

wherein the sliding locker is operable in an unlocked mode in which the base at least partially protrudes from the transverse opening, and supports the first wing in a first position in which the first wing obstructs the first verification indicia thereby inhibiting at least one of reading and scanning of the first verification indicia, and supports the second wing in the first position in which the second wing obstructs the second verification indicia thereby inhibiting at least one of reading and scanning of the second verification indicia, wherein the sliding locker is operable in a locked mode in which the base is inserted farther into the transverse opening than in the unlocked mode and supports the first wing in a second position in which the first wing allows at least one of reading and scanning of the first verification indicia, and supports the second wing in the second position in which the second wing allows at least one of reading and scanning of the second verification indicia, wherein the first lock arm and second lock arm extend in a cantilevered manner from the base and are unjoined with one another except at the base, wherein the first lock arm and second lock arm are bendable axially away from the first wing and the second wing respectively when the sliding locker transitions from the unlocked mode to the locked mode.

13. A quick connector comprising:
a connector body including a longitudinal axis and a collar configured to receive a fluid line, the collar including an outer surface and defining a transverse opening to the longitudinal axis;
a first verification indicia fixedly and immovably disposed on the outer surface of the collar;
a second verification indicia fixedly and immovably disposed on the outer surface of the collar and disposed opposite from first verification indicia across the longitudinal axis;
a sliding locker including a base, a first lock arm and a second lock arm, the base including an armature integrally and immovably joined with the base, the armature including a first wing extending downward along the collar and spaced from the outer surface of the collar, the armature including a second wing joined with the armature and disposed opposite from first wing across the longitudinal axis, the second wing extending downward along the collar and spaced from the outer surface of the collar, the first lock arm, wherein the second lock arm, the first wing and the second wing are simultaneously moveable in unison with one another;
wherein the sliding locker is operable in an unlocked mode in which the base at least partially protrudes from the transverse opening, and supports the first wing in a first position in which the first wing obstructs the first verification indicia thereby inhibiting at least one of reading and scanning of the first verification indicia, and supports the second wing in the first position in which the second wing obstructs the second verification indicia thereby inhibiting at least one of reading and scanning of the second verification indicia,
wherein the sliding locker is operable in a locked mode in which the base is inserted farther into the transverse opening than in the unlocked mode and supports the first wing in a second position in which the first wing allows at least one of reading and scanning of the first verification indicia, and supports the second wing in the second position in which the second wing allows at least one of reading and scanning of the second verification indicia,
a receiver moveably disposed in a bore defined by the connector body, the receiver defining a first slot and a second slot aligned with the transverse opening, the first lock arm and second lock arm simultaneously disposed in both the transverse opening and the first slot and the second slot,
wherein the first wing and the second wing are disposed on opposing sides of the receiver.

14. The quick connector of claim 13,
wherein the receiver includes a central plane with the longitudinal axis coincident with the central plane,
wherein the first wing extends above the central plane a first distance in the unlocked mode,
wherein the first wing extends below the central plane a second distance in the unlocked mode.

15. A method of using a quick connector, the method comprising:
providing a connector body including a longitudinal axis and a collar configured to receive a fluid line, the collar including an outer surface and defining a transverse opening to the longitudinal axis, with a verification indicia fixedly and immovably disposed on the outer surface of the collar;
providing a sliding locker installed relative to the connector body, the sliding locker including a base, a lock arm and an armature fixedly joined with the base, the armature including a wing extending along the collar and spaced from the outer surface of the collar, the sliding locker being initially configured in an unlocked mode in which a base of the locker at least partially protrudes from the transverse opening, and supports the wing in a first position in which the wing obstructs the verification indicia thereby inhibiting at least one of reading and scanning of the verification indicia;
wherein the sliding locker is configured to transition from the unlocked mode to a locked mode in which the base of the locker is inserted farther into the transverse opening than in the unlocked mode and supports the wing in a second position in which the wing allows at least one of reading and scanning of the verification indicia,
wherein the lock arm and wing simultaneously move in unison with one another when the sliding locker is transitioned from the unlocked mode to the locked mode,
transitioning the sliding locker from the unlocked mode to the locked mode;
axially bending the lock arm during the transitioning so that the lock arm moves away from a free end of the wing; and
allowing the lock arm to move back toward the free end of the wing.

16. A method of using a quick connector, the method comprising:
providing a connector body including a longitudinal axis and a collar configured to receive a fluid line, the collar including an outer surface and defining a transverse opening to the longitudinal axis, with a verification indicia fixedly and immovably disposed on the outer surface of the collar;
providing a sliding locker installed relative to the connector body, the sliding locker including a base, a lock arm and an armature fixedly joined with the base, the armature including a wing extending along the collar and spaced from the outer surface of the collar, the sliding locker being initially configured in an unlocked mode in which a base of the locker at least partially protrudes from the transverse opening, and supports the wing in a first position in which the wing obstructs the verification indicia thereby inhibiting at least one of reading and scanning of the verification indicia;
wherein the sliding locker is configured to transition from the unlocked mode to a locked mode in which the base of the locker is inserted farther into the transverse opening than in the unlocked mode and supports the wing in a second position in which the wing allows at least one of reading and scanning of the verification indicia, wherein the lock arm and wing simultaneously move in unison with one another when the sliding locker is transitioned from the unlocked mode to the locked mode,
wherein the wing includes a first wing free end,
wherein the lock arm includes a first arm free end,
wherein the first arm free end is disposed a first distance below the first wing free end,
wherein the first distance remains the same in both the unlocked mode and in the locked mode.

* * * * *

UNITED STATES PATENT AND TRADEMARK OFFICE
CERTIFICATE OF CORRECTION

PATENT NO. : 12,104,729 B2
APPLICATION NO. : 18/118288
DATED : October 1, 2024
INVENTOR(S) : Mitchell W. Hunt et al.

It is certified that error appears in the above-identified patent and that said Letters Patent is hereby corrected as shown below:

In the Claims

Column 16, Claim 9, Line 56:
"collar configured to receive a flluid line, the collar"
Should be:
– collar configured to receive a fluid line, the collar –

Signed and Sealed this
Fifth Day of November, 2024

Katherine Kelly Vidal
*Director of the United States Patent and Trademark Office*